US012775320B2

(12) United States Patent
He et al.

(10) Patent No.: US 12,775,320 B2
(45) Date of Patent: *Oct. 27, 2026

(54) SYSTEM AND METHOD FOR DYNAMIC SWITCHING BETWEEN BATTERIES IN A DUAL BATTERY SYSTEM

(71) Applicant: Dell Products L.P., Round Rock, TX (US)

(72) Inventors: Qinghong He, Austin, TX (US); Yan Ning, Cedar Park, TX (US); John Robert Lerma, Cedar Park, TX (US); Louis Michael Davis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 664 days.

This patent is subject to a terminal disclaimer.

(21) Appl. No.: 18/362,085

(22) Filed: Jul. 31, 2023

(65) Prior Publication Data

US 2023/0376099 A1 Nov. 23, 2023

Related U.S. Application Data

(62) Division of application No. 16/866,299, filed on May 4, 2020, now Pat. No. 11,755,088.

(51) Int. Cl.
*G06F 1/26* (2006.01)
*H01M 10/42* (2006.01)
(Continued)

(52) U.S. Cl.
CPC .......... *G06F 1/263* (2013.01); *H01M 10/443* (2013.01); *H01M 10/486* (2013.01); *H01M 2010/4271* (2013.01); *H01M 2010/4278* (2013.01)

(58) Field of Classification Search
CPC ... H02H 3/08; H02H 3/00; H01M 2010/4271; H01M 2010/486; H01M 10/486; H01M 10/443; H01M 10/441; H01M 10/44; H02J 7/971; H02J 7/60; H02J 7/00; H02J 7/65; H02J 7/52; H02J 7/50; G06F 1/263
See application file for complete search history.

(56) References Cited

U.S. PATENT DOCUMENTS 9,847,523 B2 * 12/2017 Iwamura ........... H01M 10/4257
9,853,473 B2 * 12/2017 Yebka ........................ G06F 1/28
(Continued)

*Primary Examiner* — Daniel I Walsh
(74) *Attorney, Agent, or Firm* — McDermott Will & Schulte LLP

(57) ABSTRACT

A system and method for dynamically switching power supply in a dual battery system to minimize unbalanced wear levels in the primary and secondary batteries. If the operating temperature of the primary battery reaches a reliability temperature threshold but the operating temperature of the secondary battery is less than the reliability temperature threshold, the controller switches a primary battery indicator to designate the secondary battery as the primary battery. If the operating temperature of the primary battery and the operating temperature of the secondary battery exceed the reliability temperature threshold, embodiments may switch based on a time the operational temperature of the first battery is equal to or greater than the reliability temperature threshold and a time the operational temperature of the second battery is equal to or greater than the reliability temperature threshold.

15 Claims, 3 Drawing Sheets

(51) Int. Cl.

| | |
|---|---|
| ***H01M 10/44*** | (2006.01) |
| ***H01M 10/48*** | (2006.01) |

(56) References Cited

U.S. PATENT DOCUMENTS

| | | | | |
|---|---|---|---|---|
| 10,991,994 | B2 * | 4/2021 | Cho | B60L 58/10 |
| 2003/0076074 | A1 * | 4/2003 | Kawai | H02J 7/875<br>320/136 |
| 2003/0167415 | A1 * | 9/2003 | Odaohhara | G06F 1/263<br>713/340 |
| 2010/0264878 | A1 | 10/2010 | Ueda et al. | |
| 2010/0327816 | A1 * | 12/2010 | Chiang | H02J 7/02<br>320/145 |
| 2014/0015488 | A1 * | 1/2014 | Despesse | B60L 58/12<br>429/7 |
| 2015/0115720 | A1 * | 4/2015 | Hysell | H01M 10/0436<br>307/65 |
| 2016/0249140 | A1 | 8/2016 | Nikles et al. | |
| 2017/0063150 | A1 * | 3/2017 | Sakamoto | H01M 10/425 |
| 2018/0278071 | A1 | 9/2018 | Murakami et al. | |
| 2020/0395640 | A1 * | 12/2020 | Sun | G01R 31/3842 |
| 2021/0341982 | A1 * | 11/2021 | He | H01M 10/443 |
| 2022/0357403 | A1 * | 11/2022 | Singer | G01R 31/3835 |
| 2023/0146978 | A1 * | 5/2023 | Chen | H01M 10/647 |
| 2024/0034153 | A1 * | 2/2024 | Neutzler | B60K 6/387 |
| 2024/0074125 | A1 * | 2/2024 | Lee | H01M 10/4285 |
| 2024/0339683 | A1 * | 10/2024 | Hung | H01M 10/441 |
| 2025/0266674 | A1 * | 8/2025 | Jung | G01R 19/16576 |
| 2025/0368056 | A1 * | 12/2025 | Anghel | B60L 50/64 |

* cited by examiner

SYSTEM AND METHOD FOR DYNAMIC SWITCHING BETWEEN BATTERIES IN A DUAL BATTERY SYSTEM

CROSS-REFERENCE TO RELATED APPLICATIONS

This application is a Divisional of U.S. patent application Ser. No. 16/866,299, filed on May 4, 2020, the entire disclosures of these applications are incorporated by reference herein.

BACKGROUND

Field of the Disclosure

This disclosure relates generally to information handling systems and, more particularly, to systems and methods for switching between batteries in a dual battery system of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may include portable devices with dual battery systems. In these dual battery systems, a first battery is designated as the primary battery, a second battery is designated as the secondary battery and an embedded controller (EC) manages the charging and discharging of the primary and secondary batteries.

When new, each battery has a charge capacity measured for example, in Watt-hours (Wh) equal to a total charge capacity (e.g., 50 Wh). Over time, the charge capacity will decrease. The rate at which the charge capacity will decrease from the total charge capacity and depends on, among other factors, the number of charge/discharge cycles. In many dual battery systems, a charging/discharging cycle begins with the primary battery discharging. When the primary battery is near full discharge, the EC switches to the secondary battery. When charging the batteries, the EC starts by charging the primary battery. Once the primary battery is charged to about 80% of its charge capacity, the EC switches to charging the secondary battery. Once the secondary battery is charged to about 80% of its charge capacity, the EC switches back to charging the primary battery. Once the primary battery is charged to 100% of its charge capacity, the EC switches to charging the secondary battery to 100% of its charge capacity. The number of charge/discharge cycles may correspond to the wear level of the battery. As a result of the charging/discharging cycles described above, the primary battery may be charged and discharged significantly more frequently than the secondary battery, resulting in unbalanced wear levels between the two batteries.

The wear levels of the primary and secondary batteries may also be affected by the operating temperatures. For example, an operating temperature of a battery in a portable information handling system can reach about 55° C. at 25° C. ambient air conditions in about 30 minutes. Many batteries have a reliability temperature threshold, wherein frequent operation at or above the reliability temperature threshold can increase the wear level and have a significant (negative) impact on a battery life. Many batteries also have a pre-shutdown temperature, wherein operation at or above pre-shutdown temperature can damage the battery and increase the wear level and have a significant (negative) impact on a battery life.

Embodiments disclosed herein monitor the operating temperatures and wear levels of batteries in dual battery systems and switch a primary battery indicator between batteries when the operating temperatures of one of the batteries is equal to or greater than a reliability temperature threshold or a pre-shutdown temperature or there are unbalanced charge capacities.

In some embodiments, if an operating temperature of the primary battery is equal to or greater than the reliability temperature threshold but an operating temperature of the secondary battery is less than the reliability temperature threshold, the EC switches to the secondary battery for power supply. In some embodiments, the EC switches a primary battery indicator to designate the secondary battery as the primary battery. Switching the primary battery indicator between the primary battery and the secondary battery may occur as often as the operating temperature of one battery is less than the reliability temperature threshold. Switching power supply between the primary battery and the secondary battery when the operating temperature of one battery is below the reliability temperature threshold allows embodiments to slow degradation of the primary battery and extend battery life.

In some embodiments, if the operating temperatures of the primary battery and the secondary battery are both equal to or greater than the reliability temperature threshold, the EC determines if the operating temperatures are equal to or greater than a pre-shutdown temperature. If the primary battery operating temperature is equal to or greater than the pre-shutdown temperature but the secondary battery operating temperature is less than the pre-shutdown temperature, the EC switches to the secondary battery for power supply. In some embodiments, the EC switches the primary battery indicator to designate the secondary battery as the primary battery. Switching power supply between the primary battery and the secondary battery may occur as often as the operating temperature of one battery is less than the pre-shutdown temperature. Switching power supply between the primary battery and the secondary battery when the operating temperature of both batteries are above the reliability temperature threshold but the operating temperature of one battery is below the pre-shutdown temperature slows degradation of the primary battery and may extend an operational temperature and improve performance of the information handling system.

Embodiments disclosed herein compare the charge capacities of batteries in dual battery systems and switch the primary battery indicator to designate the secondary battery as the primary battery based on a difference in charge capacities. In some embodiments, an embedded controller (EC) monitors wear levels of each of the primary and secondary batteries and determine if the difference in wear levels exceeds a wear level difference threshold. Each BMU may calculate a wear level of a battery. The wear level difference threshold may be a difference in the wear levels of the primary battery and the secondary battery. In some embodiments, the wear level difference threshold may be a ratio between the first battery wear level and the second battery wear level.

A memory medium may store a primary battery indicator designating a first battery as the primary battery. At each startup, an information handling system draws power from the primary battery. The EC may communicate with battery management units (BMUs) associated with the primary battery and the secondary battery to read operating temperatures and wear levels. If the operating temperature of the primary battery is equal to or greater than a reliability temperature threshold or a pre-shutdown temperature or the difference between the wear level of the primary battery is equal to or greater than a wear level difference threshold, the EC may switch the primary battery indicator to designate the secondary battery as the primary battery.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
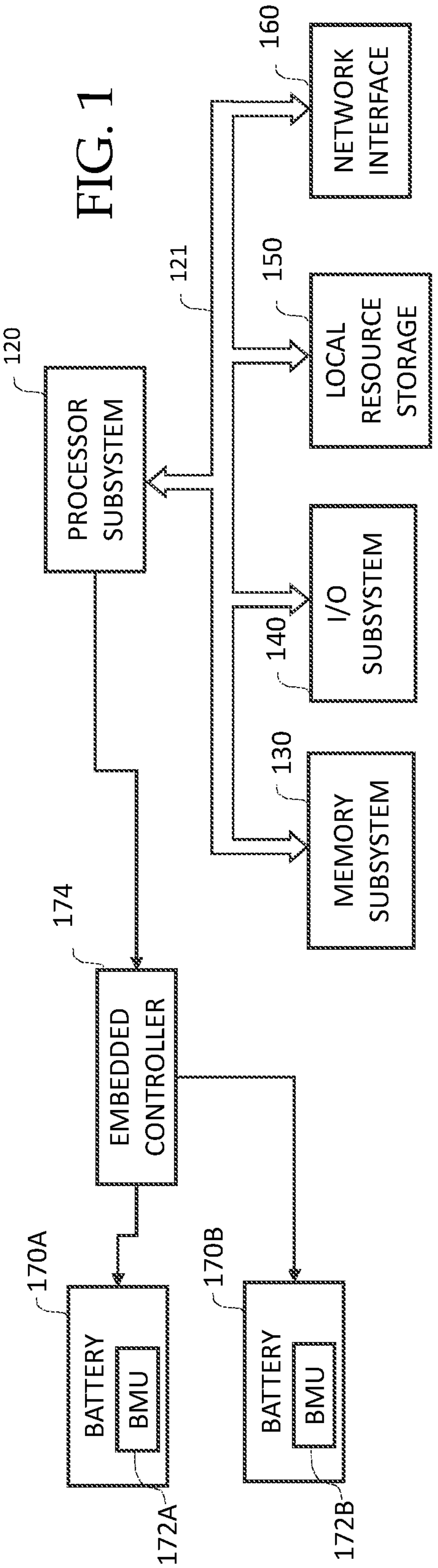
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the unhyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Information handling systems may include a dual battery system for power supply, in which a first battery is designated as the primary battery and a second battery is designated as the secondary battery. The battery life of each battery may be associated with a total charge capacity, which will decrease over time. The rate at which the total charge capacity of a battery will decrease depends on various factors, including the number of charging/discharging cycles and operating temperature of the battery.

Regarding the number of charge/discharge cycles, more charge/discharge cycles increase the wear level on the battery. In portable devices with a dual battery system, the primary battery typically has a higher wear level than the secondary battery. In particular, power is drawn from the primary battery until the primary battery is almost fully discharged before an embedded controller switches to draw power from the secondary battery. As such, primary battery experiences more charge/discharge cycles and the wear level of the primary battery will inevitably be higher than the wear level of the secondary battery. A higher wear level increases the rate at which the total charge capacity will decrease, which shortens the battery life.

Regarding the operating temperature, optimal battery life is generally based on the assumption the battery will be operating at or near an optimal temperature (e.g., 60° C.). If an information handling system is operating under heavy workloads or in higher ambient air temperatures, an operating temperature of the primary battery may exceed a reliability temperature threshold (e.g., 65° C.) but an operating temperature of the secondary battery may be relatively low. Operating a battery at temperatures above the reliability temperature threshold, especially for a prolonged time period or more frequently, increases the wear level of the battery, shortening the battery life. Continued operation of a battery above the reliability temperature threshold may cause the operating temperature to exceed a maximum temperature (also known as a shutdown temperature) at which the battery will not discharge and will shut down to prevent damage. A shutdown temperature may be, for example, 70° C.

A battery encapsulated in a housing inside a chassis may be capable of operating at temperatures up to 30° C. higher than ambient air temperatures, such that operating the battery in a 40° C. ambient air temperature may cause the battery to reach a 70° C. shutdown temperature.

Embodiments disclosed herein are described with respect to portable information handling systems with dual battery systems. Particular embodiments are best understood by reference to FIGS. 1-4 wherein like numbers are used to indicate like and corresponding parts.

Turning to the drawings, FIG. 1 illustrates a block diagram depicting selected elements of an embodiment of information handling system 100. It is noted that FIG. 1 is not drawn to scale but is a schematic illustration.

As shown in FIG. 1, components of information handling system 100 may include, but are not limited to, a processor subsystem 120, which may comprise one or more processors, and a system bus 121 that communicatively couples various system components to processor subsystem 120 including, for example, a memory subsystem 130, an I/O subsystem 140, local storage resource 150, and a network interface 160. Also shown within information handling system 100 are first battery 170A with battery management unit (BMU) 172A and second battery 170B with battery management unit (BMU) 172B and embedded controller (EC) 174. EC 174 is communicatively coupled to BMU 172A associated with first battery 170A, BMU 172B associated with second battery 170B and processor subsystem 120, discussed below in more detail.

Processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

System bus 121 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also, in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Local storage resource 150 may comprise computer-readable media (e.g., hard disk drive, floppy disk drive, CD-ROM, and other type of rotating storage media, flash memory, EEPROM, or another type of solid-state storage media) and may be generally operable to store instructions and data. For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory, such as a solid-state drive (SSD) comprising solid-state flash memory; as well as communications media such as wires, optical fibers, microwaves, radio waves, and other electromagnetic or optical carriers; or any combination of the foregoing.

Network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, information handling system 100 includes first battery 170A and second battery 170B and may be referred to as a dual battery system. First battery 170A includes first battery management unit (BMU) 172A and second battery 170B includes second battery management unit (BMU) 172B. First BMU 172A and second BMU 172B may include sensors, memory and processing functionality to determine the total charge capacity, the remaining charge capacity, the charge level, the charge rate, the wear level, the number of charge/discharge cycles, and the temperature of first battery 170A and second battery 170B, respectively.

Total charge capacity and the remaining charge capacity may be measured in Watt-hours (Wh), charge level and wear level may be measured as a percent (%), and charge rate may be measured in Watts (W), for example.

A battery is manufactured with a total charge capacity (e.g. 50 Wh). Over the battery life, the charge capacity of the battery will decrease to a level at which the battery does not hold a charge. The rate at which the charge capacity of the battery decreases from the total charge capacity to the end of the battery life may correspond to the wear level, which may be affected by the operating temperature and number of charge/discharge cycles of the battery. To maximize performance of information handling system 100 while extending the battery life of first battery 170A and second battery 170B, embodiments include EC 174 configured to dynamically switch power supply between first battery 170A and second battery 170B.

As depicted in FIG. 1, embedded controller 174 is communicatively coupled to first battery 170A, second battery 170B and processor subsystem 120. EC 174 may include memory storing a primary battery indicator that designates one of first battery 170A or second battery 170B as the primary battery.

EC 174 may execute a set of instructions such that, at startup, EC 174 may communicate with the memory to identify the primary battery and ensure power to information handling system 100 is drawn from the primary battery. During operation of information handling system 100, EC 174 may read temperatures and wear levels or other factors that can negatively affect charge capacity of a battery and switch the primary battery indicator between the primary battery and the secondary battery. In some embodiments EC 174 can switch a primary battery indicator based on the operating temperature of the primary battery exceeding a reliability temperature threshold or a pre-shutdown temperature or unbalanced charge capacities between the primary and secondary batteries.

In some embodiments, each of first BMU 172A and second BMU 172B include temperature sensors and EC 174 communicates with first BMU 172A and second BMU 172B to receive temperatures for each of first battery 170A and second battery 170B. EC 174 may also communicate with each of first BMU 172A and second BMU 172B to determine charge capacities of first battery 170A and second battery 170B and switch the primary battery indicator based on a comparison of the charge capacities.

Figure 2:
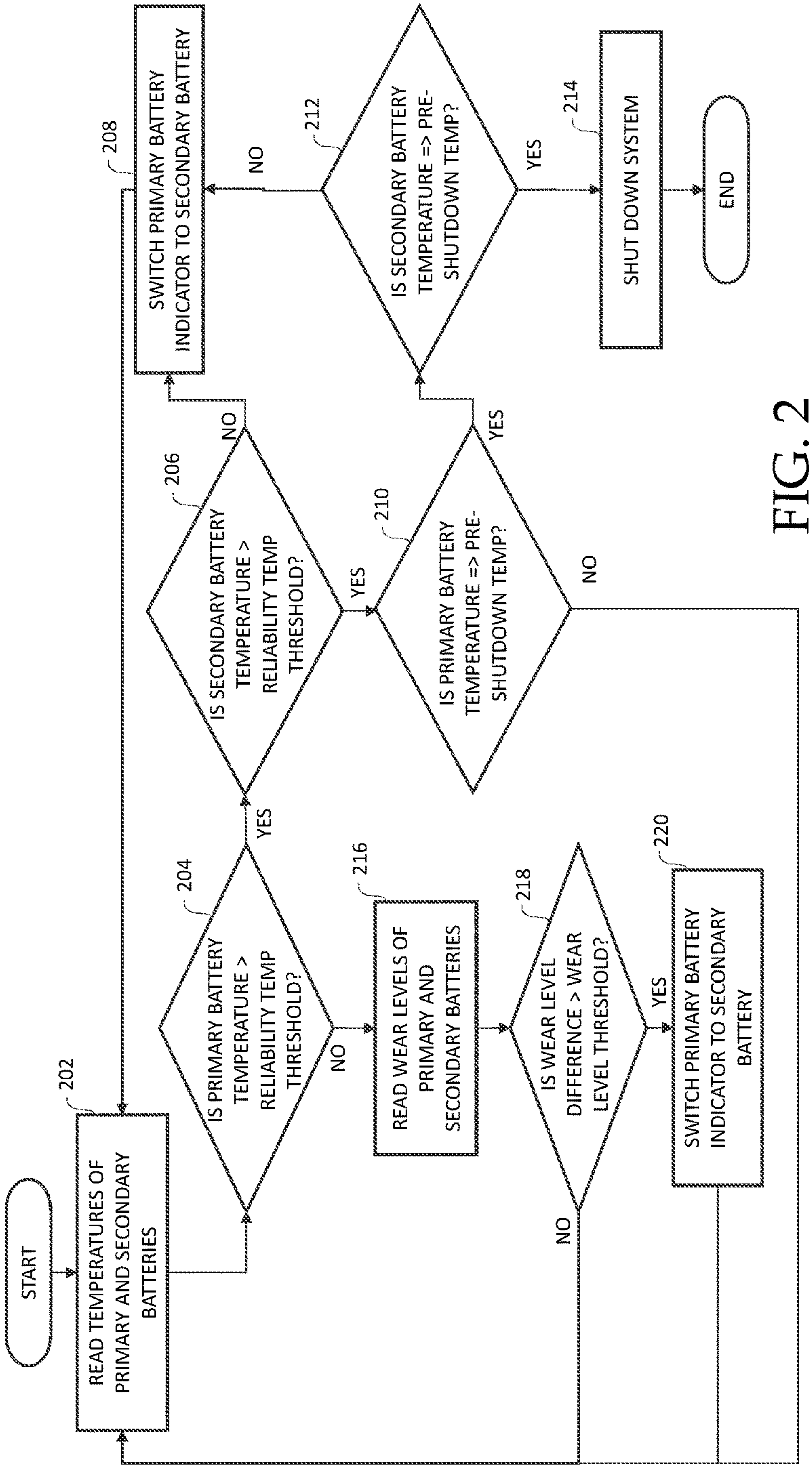
FIG. 2 is a flow diagram of an exemplary method for dynamically switching power supply from a primary battery to a secondary battery and for switching a primary battery indicator designating a secondary battery as the primary battery in an information handling system.

FIG. 2 depicts a flow diagram of a method for dynamically switching a primary battery indicator between a primary battery and a secondary battery in a dual battery system based on operating temperatures or unbalanced charge capacities.

Initially, a memory medium may store a primary battery indicator designating first battery 170A or second battery 170B as the primary battery. For ease of understanding, the method is described with first battery 170A designated as the primary battery and second battery 170B designated as the secondary battery.

The method starts at step 202 when EC 174 reads an operating temperature of the primary battery.

At step 204, EC 174 determines if the operating temperature of the primary battery is equal to or greater than a reliability temperature threshold (e.g., 65° C.).

If the operating temperature of the primary battery is equal to or greater than the reliability temperature threshold, then at step 206, EC 174 reads an operating temperature of the secondary battery and determines if the operating temperature of the secondary battery is equal to or greater than the reliability temperature threshold.

If the operating temperature of the primary battery is equal to or greater than the reliability temperature threshold but the operating temperature of the secondary battery is less than the reliability temperature threshold, then at step 208, EC 174 may dynamically switch power supply from the primary battery to the secondary battery and may further switch a primary battery indicator to designate the secondary battery as the primary battery. In this scenario, if first battery 170A is operating as the primary battery and its operating temperature is equal to or greater than a reliability temperature threshold (e.g. 65° C.), EC 174 may switch the primary battery indicator to designate second battery 170B as the primary battery.

Steps 202, 204, 206 and 208 may be repeated to switch power supply between the primary battery and the secondary battery any number of times as long as the operating temperature of at least one of the primary battery and the secondary battery is less than the reliability temperature threshold. In information handling system 100, dynamically switching power supply between the primary battery and the secondary battery when the operating temperature of one battery is below the reliability temperature threshold may reduce or avoid the time that first battery 170A and second battery 170B operate above the reliability temperature threshold, which may slow the rate at which the total charge capacity of first battery 170A and second battery 170B will decrease.

If the operating temperature of the primary battery and the operating temperature of the secondary battery are both equal to or greater than the reliability temperature threshold, then at step 210, EC 174 may determine if the operating temperature of the primary battery is equal to or greater than a pre-shutdown temperature (e.g., 69° C. for a 70° C. shutdown temperature).

If the operating temperature of the primary battery is equal to or greater than a pre-shutdown temperature, then at step 212, EC 174 may determine if the operating temperature of the secondary battery is equal to or greater than the pre-shutdown temperature.

If the operating temperature of the primary battery is equal to or greater than the pre-shutdown temperature but the operating temperature of the secondary battery is less than the pre-shutdown temperature, then EC 174 may dynamically switch power supply from the primary battery to the secondary battery at step 208. In some embodiments, EC 174 may further switch the primary battery indicator to designate the secondary battery as the primary battery at step 208. In this scenario, if first battery 170A is operating as the primary battery and its operating temperature is equal to or greater than the pre-shutdown temperature (e.g. 69° C.), EC 174 may switch the primary battery indicator to designate second battery 170B as the primary battery.

Steps 202, 204, 206, 208, 210 and 212 may be repeated to switch the primary battery indicator between the primary battery and the secondary battery any number of times as long as the operating temperature of at least one of the primary battery and the secondary battery is less than the pre-shutdown temperature. In information handling system 100, dynamically switching power supply between the primary battery and the secondary battery may reduce or avoid operation of first battery 170A and second battery 170B above the pre-shutdown temperature, which may reduce the chances of damage to first battery 170A and second battery 170B. Furthermore, switching the primary battery indicator between the primary battery and the secondary battery may slow the rate at which the total charge capacity of first battery 170A and second battery 170B will decrease, extending the battery life of first battery 170A and second battery 170B.

If the operating temperature of the primary battery and the operating temperature of the secondary battery are both equal to or greater than a pre-shutdown temperature, then at step 214, EC 174 may communicate a signal to processor subsystem 120 to shut down information handling system 100.

Information handling system 100 may be operated in cooler ambient air conditions and at low workloads such that the operating temperature of the primary battery never exceeds the reliability temperature threshold. In these situations, if, for example, first battery 170A remains the primary battery, the charge capacities or battery lives of first battery 170A and second battery 170B may become unbalanced. In some embodiments, EC 174 may communicate with BMUs 172A, 172B, compare the wear levels, the number of charge/discharge cycles or some other operating characteristic of first battery 170A and second battery 170B to determine is the charge capacity or battery life of first battery 170A and second battery 170B are unbalanced.

In some embodiments, if, at step 204, EC 174 determines the operating temperature of the primary battery is less than the reliability temperature threshold, EC 174 reads the wear levels of the primary and secondary batteries at step 216.

At step 218, EC 174 determines if the difference in wear levels of the primary battery and the secondary battery is equal to or greater than a wear level difference threshold. In some embodiments, the wear level difference threshold may be a difference in the percentage of the charge capacity. For example, first battery 170A and second battery 170B may be manufactured with a total charge capacity of 50 Wh and a wear level difference threshold may be set at 5 Wh. In information handling system 100, first battery 170A may be operating as the primary battery. If the charge capacity of first battery 170A decreases to 45 Wh (i.e., a 10% wear level) but the charge capacity of second battery 170B is at 48 Wh (i.e., a 4% wear level) and the wear level difference threshold is 5%, EC 174 may determine the difference in charge capacity is greater than the wear level difference threshold and switch the primary battery indicator to designate second battery 170B as the primary battery at step 220. In some embodiments, a wear level difference threshold may be based on a percentage of the charge capacity (e.g., 10%). In some embodiments, a wear level difference threshold may be set as a value (e.g., 4 Wh). In some embodiments, a wear level difference threshold may correspond to a ratio of the wear level of the primary battery and the wear level of the secondary battery. For example, a wear level difference threshold may be a ratio of 2:1, wherein if the wear level of the primary battery is 12% and the wear level of second battery 170B operating as the secondary battery is only 6%, EC 174 may determine the ratio of the wear levels is 2:1 and switch the primary battery indicator to designate second battery 170B as the primary battery at step 220.

The steps depicted in FIG. 2 may be repeated any number of times to reduce the negative effects of operating first battery 170A and second battery 170B above a reliability temperature threshold and a pre-shutdown temperature and reduce unbalanced wear levels or charge capacities between first battery 170A and second battery 170B.

Figure 3:
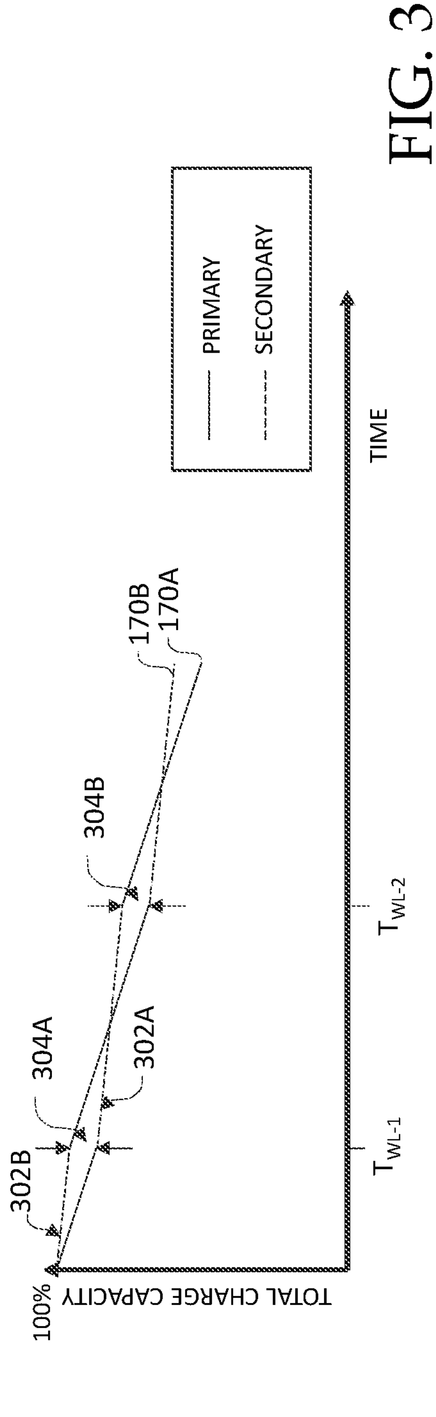
FIG. 3 is a graph depicting simulated battery wear levels and points at which a primary battery indicator is switched in a dual battery system for an information handling system.

FIG. 3 depicts a graph illustrating the decrease in charge capacities for a primary battery and a second battery over time and further illustrates the effects of dynamically switching a primary battery indicator between a primary battery and a secondary battery based on unbalanced wear levels. Initially, a memory medium may store a primary battery indicator designating first battery 170A or second battery 170B as the primary battery.

As depicted in FIG. 3, line 302A represents a charge capacity of first battery 170A and line 302B represents a charge capacity of second battery 170B. For ease of understanding, FIG. 3 is described with the primary battery initially represented by a solid line and the secondary battery initially represented by a dashed line.

Initially, first battery 170A and second battery 170B have the same total charge capacity. However, an increased number of charging/discharging cycles of first battery 170A operating as the primary battery causes a higher wear level of first battery 170A. As a result of the higher wear level, at a first time ($T_{WL-1}$), the wear levels of first battery 170A and second battery 170B may be unbalanced such that the charge capacity of first battery 170A is significantly less than the charge capacity of second battery 170B, represented in FIG. 3 by gap 304A. EC 174 may determine the difference in wear levels is equal to or greater than a wear level difference threshold. At time $T_{WL-1}$, EC 174 may switch the primary battery indicator to designate second battery 170B as the primary battery (indicated by line 302B changing from a dashed line to a solid line) and first battery 170A may operate as the secondary battery (indicated by line 302A changing from a solid line to a dashed line). Information handling system 100 may continue to draw power from second battery 170B operating as the primary battery until a second time ($T_{WL-2}$) at which first battery 170A and second battery 170B may have unbalanced wear levels indicating the charge capacity of second battery 170B is significantly less than the charge capacity of first battery 170A, represented by gap 304B. At time $T_{WL-2}$, EC 174 may switch the primary battery indicator stored in memory to designate first battery 170A as the primary battery (indicated by line 302A changing from a dashed line to a solid line) and designate second battery 170B as the secondary battery (indicated by line 302B changing from a solid line to a dashed line). EC 174 may the primary battery indicator between first battery 170A and second battery 170B each time the wear levels are unbalanced and the difference in wear levels is equal to or greater than a wear level difference threshold.

Figure 4:
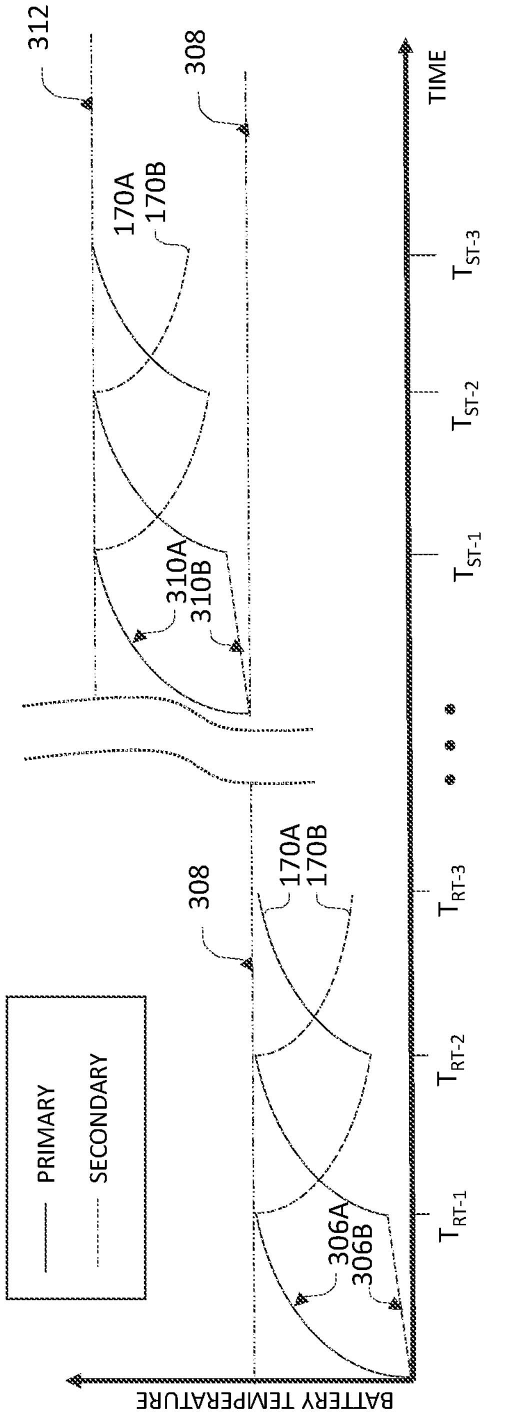
FIG. 4 is a graph depicting simulated battery temperatures and points at which power supply in an information handling system is switched between a primary battery and a secondary battery in a dual battery system.

FIG. 4 depicts a graph illustrating operating temperatures for a primary battery and a secondary battery and further illustrates possible performance benefits associated with dynamically switching between the primary battery and the secondary battery. Initially, a memory medium may store a primary battery indicator designating first battery 170A or second battery 170B as the primary battery. For ease of understanding, FIG. 4 is described with first battery 170A designated as the primary battery and second battery 170B designated as the secondary battery.

As depicted on the left side of the graph in FIG. 4, line 306A represents an operating temperature of first battery 170A and line 306B represents a temperature of second battery 170B. As depicted in FIG. 3, line 306A is solid and line 306B is dashed, indicating first battery 170A is designated as the primary battery and second battery 170B is the secondary battery, respectively.

Initially, the temperatures of first battery 170A and second battery 170B may be the same. However, as depicted in FIG. 4, operation of first battery 170A as the primary battery may cause the operating temperature of first battery 170A to increase more rapidly than the operating temperature of second battery 170B.

EC 174 may read temperatures of first battery 170A. For as long as the operating temperature of first battery 170A remains less than reliability temperature threshold 308, power may be drawn from first battery 170A operating as the primary battery.

If, at a first time ($T_{RT-1}$), the operating temperature of first battery 170A operating as the primary battery is equal to or greater than reliability temperature threshold 308, EC 174 may determine if the operating temperature of second battery 170B is equal to or greater than reliability temperature threshold 308. As depicted in FIG. 4, at time $T_{RT-1}$, EC 174 may dynamically switch a primary battery indicator to designate second battery 170B as the primary battery (indicated by line 306A changing from a solid line to a dashed line and line 306B changing from a dashed line to a solid line). Information handling system 100 may draw power from second battery 170B operating as the primary battery for as long as the operating temperature of second battery 170B remains less than reliability temperature threshold 308.

If, at a second time ($T_{RT-2}$), the operating temperature of second battery 170B operating as the primary battery is equal to or greater than reliability temperature threshold 308, EC 174 may determine if the operating temperature of first battery 170A is equal to or greater than reliability temperature threshold 308. As depicted in FIG. 4, at time $T_{RT-2}$, EC 174 may dynamically switch the primary battery indicator to designate first battery 170A as the primary battery (indicated by line 306B changing from a solid line to a dashed line and line 306A changing from a dashed line to a solid line). Information handling system 100 may continue to switch the primary battery indicator between first battery 170A and second battery 170B as often as the operating temperature of at least one of first battery 170A and second battery 170B remains less than reliability temperature threshold 308.

Dynamically switching the primary battery indicator between the primary battery and the secondary battery may allow information handling system 100 to operate at a higher capacity and may also reduce the rate at which the charge capacity of first battery 170A and second battery 170B will decrease, extending the battery life of first battery 170A and second battery 170B.

In some situations, the operating temperature of first battery 170A and second battery 170B may both exceed reliability temperature threshold 308.

As depicted on the right side of the graph in FIG. 4, line 310A represents an operating temperature of first battery 170A and line 310B represents an operating temperature of second battery 170B when both operating temperatures exceed reliability temperature threshold 308. As depicted in FIG. 4, line 310A is solid and line 310B is dashed, indicating first battery 170A is designated as the primary battery and second battery 170B is the secondary battery, respectively.

EC 174 may read temperatures of the primary battery and the secondary battery. For as long as the operating temperature of the primary battery and the secondary battery are greater than the reliability temperature threshold but the operating temperature of the primary battery remains less than pre-shutdown temperature 312, power may be drawn from the primary battery.

If, at a first time ($T_{ST-1}$), the operating temperature of the primary battery is equal to or greater than pre-shutdown temperature 312, EC 174 may determine if the operating temperature of the secondary battery is equal to or greater than pre-shutdown temperature 312. As depicted in FIG. 4, at time $T_{ST-1}$, EC 174 may dynamically switch the primary battery indicator to designate second battery 170B as the primary battery (indicated by line 310A changing from a solid line to a dashed line and line 310B changing from a dashed line to a solid line).

Information handling system 100 may draw power from second battery 170B operating as the primary battery for as long as the operating temperature of second battery 170B remains less than pre-shutdown temperature 312. However, if the operating temperature of second battery 170B operating as the primary battery is equal to or greater than pre-shutdown temperature 312, EC 174 may determine if the operating temperature of first battery 170A is equal to or greater than pre-shutdown temperature 312. If the operating temperature of first battery 170A is less than pre-shutdown temperature 312, then as depicted in FIG. 4, EC 174 may dynamically switch the primary battery indicator to designate first battery 170A as the primary battery (indicated by line 310B changing from a solid line to a dashed line and line 310A changing from a dashed line to a solid line). Information handling system 100 may continue to switch the primary battery indicator between first battery 170A and second battery 170B as often as the operating temperature of at least one of first battery 170A and second battery 170B remains less than pre-shutdown temperature 312.

Dynamically switching the primary battery indicator between the primary battery and the secondary battery may allow information handling system 100 to operate for a longer period without data loss due to shutdown and operate without damage to first battery 170A and second battery 170B. Dynamically switching power supply between first battery 170A and second battery 170B when the operating temperatures of both batteries is greater than reliability threshold 308 may also reduce the rate at which the total charge capacity of first battery 170A and second battery 170B will decrease, extending the battery life of first battery 170A and second battery 170B.

If the operating temperatures of both first battery 170A and second battery 170B are equal or greater than pre-shutdown temperature 312, embodiments may communicate a signal to processor subsystem 120 to shut down information handling system 100.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A battery system for an information handling system, the battery system comprising:
- a first battery;
- a second battery;
- a controller; and
- a memory medium communicatively coupled to the controller, the memory medium storing a primary battery indicator designating the first battery as the primary battery and a set of instructions executable by the controller to:
  - determine an operating temperature of the first battery;
  - if the operating temperature of the first battery is equal to or greater than a reliability temperature threshold:
    - determine an operating temperature of the second battery; and
    - if the operating temperature of the second battery is less than the reliability temperature threshold, switch the primary battery indicator in the memory medium to designate the second battery as the primary battery; and if the operating temperature of the first battery and the operating temperature of the second battery are equal to or greater than the reliability temperature threshold, the set of instructions are further executable by the controller to:

determine if the operating temperature of the first battery is equal to or greater than a pre-shutdown temperature;

if the operating temperature of the first battery is equal to or greater than a pre-shutdown temperature, determine if the operating temperature of the second battery is equal to or greater than the pre-shutdown temperature;

if the operating temperature of the first battery and the operating temperature of the second battery are equal to or greater than the pre-shutdown temperature, send a signal to power down the information handling system;

determine a difference between a time the operational temperature of the first battery is equal to or greater than the reliability temperature threshold and a time the operational temperature of the second battery is equal to or greater than the reliability temperature threshold; and switch the primary battery indicator in the memory medium to designate the second battery as the primary battery when the difference exceeds a wear level difference threshold.

2. The battery system of claim 1, wherein the wear level difference comprises a ratio of the time the operational temperature of the first battery is equal to or greater than the reliability temperature threshold and the time the operational temperature of the second battery is equal to or greater than the reliability temperature threshold.

3. The battery system of claim 1, wherein the set of instructions are executable by the controller to:

determine a difference between a number of charging/discharging cycles of the first battery and a number of charging/discharging cycles of the second battery; and switch the primary battery indicator in the memory medium to designate the second battery as the primary battery when the difference between the number of charging/discharging cycles of the first battery and the number of charging/discharging cycles of the second battery exceeds the wear level difference threshold.

4. The battery system of claim 2, wherein:

the set of instructions are executable by the controller to:

determine a percentage of a charge capacity of the first battery;

determine a percentage of a charge capacity of the second battery; and switch the primary battery indicator in the memory medium to designate the second battery as the primary battery when the difference between the percentage of the charge capacity of the first battery and the percentage of the charge capacity of the second battery exceeds the wear level difference threshold.

5. The battery system of claim 1, wherein:

if the operating temperature of the second battery is less than the pre-shutdown temperature, switch the primary battery indicator to designate the second battery as the primary battery.

6. A dual battery system for an information handling system, the dual battery system comprising:

a first battery having a first battery management unit (BMU);

a second battery having a second BMU;

a controller communicatively coupled to the first BMU and the second BMU; and a memory medium communicatively coupled to the controller, the memory medium storing a primary battery indicator designating the first battery as a primary battery and a set of instructions executable by the controller to:

determine an operating temperature of the first battery;

if the operating temperature of the first battery is equal to or greater than the reliability temperature threshold:

determine an operating temperature of the second battery; and if the operating temperature of the second battery is less than the reliability temperature threshold, switch the primary battery indicator in the memory medium to designate the second battery as the primary battery;

if the operating temperature of the first battery and the operating temperature of the second battery are equal to or greater than the reliability temperature threshold:

determine if the operating temperature of the first battery is equal to or greater than a pre-shutdown temperature;

if the operating temperature of the first battery is equal to or greater than a pre-shutdown temperature, determine if the operating temperature of the second battery is equal to or greater than the pre-shutdown temperature;

if the operating temperature of the first battery and the operating temperature of the second battery are equal to or greater than the pre-shutdown temperature, send a signal to power down the information handling system;

determine a difference between a time the operational temperature of the first battery is equal to or greater than the reliability temperature threshold and a time the operational temperature of the second battery is equal to or greater than the reliability temperature threshold;

switch the primary battery indicator in the memory medium to designate the second battery as the primary battery when the difference exceeds a wear level difference threshold.

7. The dual battery system of claim 6, wherein:

the wear level difference comprises a ratio of the time the operational temperature of the first battery is equal to or greater than the reliability temperature threshold and the time the operational temperature of the second battery is equal to or greater than the reliability temperature threshold.

8. The dual battery system of claim 6, wherein:

the wear level of the first battery corresponds to a number of charging/discharging cycles of the first battery;

the wear level of the second battery corresponds to a number of charging/discharging cycles of the second battery; and the wear level difference comprises a difference between the number of charging/discharging cycles of the first battery and the number of charging/discharging cycles of the second battery.

9. The dual battery system of claim 6, wherein:

the wear level of the first battery comprises a percentage of a charge capacity of the first battery;

the wear level of the second battery comprises a percentage of a charge capacity of the second battery.

10. The dual battery system of claim 8, wherein:

if the operating temperature of the second battery is less than the pre-shutdown temperature, switch the primary battery indicator to designate the second battery as the primary battery.

11. A portable information handling system contained in a chassis, the portable information handling system being capable of drawing power from a dual battery system comprising:

a first battery having a first battery management unit (BMU);

a second battery having a second BMU;

a controller communicatively coupled to the first BMU and the second BMU; and a memory medium communicatively coupled to the controller, the memory medium storing a primary battery indicator designating the first battery as a primary battery and set of instructions executable by the controller to:

determine an operating temperature of the first battery;

if the operating temperature of the first battery is equal to or greater than the reliability temperature threshold:

determine an operating temperature of the second battery; and if the operating temperature of the second battery is less than the reliability temperature threshold, switch the primary battery indicator to designate the second battery as the primary battery;

if the operating temperature of the first battery and the operating temperature of the second battery are equal to or greater than the reliability temperature threshold:

determine if the operating temperature of the first battery is equal to or greater than a pre-shutdown temperature;

if the operating temperature of the first battery is equal to or greater than a pre-shutdown temperature, determine if the operating temperature of the second battery is equal to or greater than the pre-shutdown temperature;

if the operating temperature of the first battery and the operating temperature of the second battery are equal to or greater than the pre-shutdown temperature, send a signal to power down the information handling system;

determine a difference between a time the operational temperature of the first battery is equal to or greater than the reliability temperature threshold and a time the operational temperature of the second battery is equal to or greater than the reliability temperature threshold; and switch the primary battery indicator in the memory medium to designate the second battery as the primary battery when the difference exceeds a wear level difference threshold.

12. The portable information handling system of claim 11, wherein the wear level difference threshold comprises a ratio of the wear level of the primary battery and the wear level of the secondary battery.

13. The portable information handling system of claim 11, wherein:

the wear level of the first battery corresponds to a number of charging/discharging cycles of the first battery;

the wear level of the second battery corresponds to a number of charging/discharging cycles of the second battery; and the wear level difference comprises a difference between the number of charging/discharging cycles of the first battery and the number of charging/discharging cycles of the second battery.

14. The portable information handling system of claim 11, wherein:

the wear level of the first battery comprises a percentage of a charge capacity of the first battery; and the wear level of the second battery comprises a percentage of a charge capacity of the second battery.

15. The portable information handling system of claim 11, wherein:

if the operating temperature of the second battery is less than the pre-shutdown temperature, switch the primary battery indicator to designate the second battery as the primary battery.

* * * * *